US006963350B1

(12) United States Patent
Perani et al.

(10) Patent No.: US 6,963,350 B1
(45) Date of Patent: Nov. 8, 2005

(54) PAINTING INTERFACE TO COMPUTER DRAWING SYSTEM CURVE EDITING

(75) Inventors: Michael J. Perani, San Rafael, CA (US); Yong Joo Kil, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 309 days.

(21) Appl. No.: 09/898,653

(22) Filed: Jul. 3, 2001

(51) Int. Cl.[7] .............................................. G09G 5/00
(52) U.S. Cl. ...................... 345/676; 345/672; 345/619; 345/647
(58) Field of Search ............................... 345/646, 647, 345/619, 672, 682, 441, 442, 473, 474, 676, 345/673

(56) References Cited

U.S. PATENT DOCUMENTS

| | | | |
|---|---|---|---|
| 4,908,874 A | | 3/1990 | Gabriel |
| 5,175,808 A | | 12/1992 | Sayre |
| 5,182,548 A | * | 1/1993 | Haeberli ...................... 345/639 |
| 5,347,620 A | * | 9/1994 | Zimmer ...................... 345/592 |
| 5,611,036 A | * | 3/1997 | Berend et al. .............. 345/441 |
| 6,111,588 A | | 8/2000 | Newell |
| 6,373,490 B1 | * | 4/2002 | Bendiksen et al. ......... 345/441 |
| 6,384,835 B1 | * | 5/2002 | Reiter et al. ................ 345/582 |
| 6,459,439 B1 | * | 10/2002 | Ahlquist et al. ............ 345/672 |
| 6,628,295 B2 | | 9/2003 | Wilensky |

OTHER PUBLICATIONS

Adobe "Adobe Illustrator 8.0 Classroom In A Book", Adobe Systems Incorporated 1998, pp. 103, 107, 114, 118-119, 128, 130-132, 134-136, 168-170, 335,337, 374.*
Mordy Golding "Sams Teach Yourself Adobe Illustrator 9 in 24 Hours", Sams, 2000, pp. 1-9.*

Paul Borrel and Ari Rappoport "Simple Constrained Deformations for Geometric Modeling and Interactive Design", ACM 1994, pp. 137-155.*
Chi, S. et al., "Drawing and Animation Using Skeletal Strokes", Preceedings of the 21st annual conference on Computer graphics and interactive techniques, Jul. 1994.*
George Wolberg, "*Digital Image Warping,*" IEEE Computer Society Press Order No. 1944, Los Alamitos, California, ISBN 0-8186-8944-7, pp. 222-240, 1990.
Jonas Gomes, et al., "*Warping and Morphing of Graphical Objects,*" Morgan Kaufmann Publishers, Inc. ISBN 1-55860-464-2, pp.: 326-329, 1999.
Paul S. Heckbert, "*Fundamentals of Texture Mapping and Image Warping,*" Master's Thesis under the direction of Carlo Séquin, Dept. of Electrical Engineering and Computer Science, University of California, Berkeley, CA 94720, pp. 1-86 and 1 pg. errata, Jun. 17, 1989.
B.E.J. Dahlberg, et al., "*Shape Preserving Approximations,*" The mathematics of surfaces II, Clarendon Press, Oxford, pp. 419-426, 1987.
Nur Arad, "*Grid-distorting on nonrectangular grids,*" Computer Aided Geometric Design, ISSN 0167-8396, CAGDEX 15(5), pp. 475-493, 1998.

(Continued)

*Primary Examiner*—Sumati Lefkowitz
*Assistant Examiner*—Chante Harrison
(74) *Attorney, Agent, or Firm*—Fish & Richardson P.C.

(57) ABSTRACT

Methods and apparatus, including computer program products, implementing and using techniques for performing computer graphics operations on an image represented by digital data. A representation of a digital image is received. The image includes vector objects, each specified by control points. An editing brush is provided for interactive editing of the image by a user. The editing brush has a region of influence and applies a displacement function to control points in the region of influence, whereby when the editing brush is applied by the user to the image, a local distortion of the image is generated.

48 Claims, 4 Drawing Sheets

OTHER PUBLICATIONS

Max Froumentin, et al., "*A Vector-based Representation for Image Warping,*" The International Journal If the Eurographics, ISSN 0167-7055, vol. 19, No. 3, pp. C419-C425, Aug. 2000.

Chi-Wing Fu, et al., "*Computing Visibility for Triangulated Panoramas,*" Rendering Techniques '99, SpingerComputerScience, pp. 161-173, SpingerWien-NewYork, 1999.

Pierre Landau, et al., "*Subset Warping: Rubber Sheeting with Cuts,*" CVGIP: Graphical Models and Image Processing, ISSN 1049-9652, vol. 56, No. 3, pp. 247-266, May 1994.

George Wolberg, "*Skeleton-based image warping,*" The Visual Computer, International Journal of Computer Graphics, vol. 5, No. 1/2, Mar. 1989.

George Wolberg, "*Recent Advances in Image Morphing,*" IEEE Proceedings, CGI '96: Computer Graphics International, Pohang, Korea, pp. 64-71, Jun. 24-28, 1996.

* cited by examiner

Twirl

Exhale

Inhale

PAINTING INTERFACE TO COMPUTER DRAWING SYSTEM CURVE EDITING

BACKGROUND

This invention relates to computer drawing systems.

Most conventional computer drawing systems include a set of drawing tools for modifying a vector object's outlines. An object's outline can be modified by applying a drawing tool to one or more control points along the objects outline or bounding box. The drawing tools, that are also referred to as point or curve editors, can be controlled by a user to perform operations such as moving a control point from one position to another position on a page where the object is represented, introducing new control points in the outline to provide a more detailed definition to a shape, and removing control points that are no longer needed.

Abstract control point manipulation functionality exists in a number of conventional computer drawing systems, such as Freehand® by Macromedia Incorporated (San Francisco, Calif.), and Adobe® Illustrator® by Adobe Systems Incorporated (San Jose, Calif.). This functionality is typically represented as a set of filters, through which a graphical object passes in order to produce a modified graphical object. Functionality for introducing detail by adding control points and simplifying shapes by removing control points are examples of such filters.

Enveloping is another method of abstracting control point manipulation, that exists in a number of drawing systems, such as Corel DRAW® and KPT Vector Effects®, both by Corel Corporation (Ottawa, Ontario, Canada). Envelopes perform shape-editing operations on a graphical object using another object as a guide. A typical example of enveloping is to use the outline of a shape to shrink and elongate letterforms to simulate the appearance of a banner curling in the wind. The banner shape, which is much simpler than the letterforms, is manipulated using standard point editing controls and all of the control points of the letterforms conform to the general shape of the controlling outline.

The concept of editing the overall sweep of a curve while preserving details of the curve has been discussed by Adam Finkelstein and David Salesin in "Multi-Resolution Curves" (Proceedings of SIGGRAPH '94, pages 261–268, ACM, New York, 1994). Their technique is based on a multi-resolution representation of a curve analogous to a Fourier series. A variant of this concept exists in Adobe® Illustrator®.

A number of computer drawing systems include a facility for performing Boolean operations such as union and difference on graphical shapes. Corel DRAW, extends this idea to permit an interactive shape union of an existing shape with the shape swept out by a circular brush.

Several computer paint systems include an image editing facility that enables the pixels of an image to "flow" according to gestures made with an input device in a fashion resembling the response of a physical viscous fluid.

Even though the drawing applications described above provide a flexible working environment for the users, they do exhibit some shortcomings. Some of these shortcomings will be described here.

When using filters to modify the curves of objects, the filter input variables are under user control, but the user generally does not control the area of their application. That is, the filtering operation is applied uniformly over the entire curve definition of the object.

Envelopes are a very powerful abstraction to control point editing, enabling the modification of numerous control points simultaneously, but are in most cases a poor choice when the goal is to refine the complexity of an object either by introducing or by eliminating control points.

Multi-resolution analysis shares the remapping strengths of enveloping while providing a mechanism for complexity refinement. The complexity refinement is generally analogous to filters, that is, the selective inclusion of different frequencies of detail in the curve is done on a curve-wide basis. Adding detail to the curve is accomplished by synthesizing a new series of frequencies. Selective refinement in the frequency domain makes local refinement in the spatial domain problematic, particularly from a user interface perspective.

Boolean shape operations are a powerful technique for assembling complex outlines from relatively simple outlines. However, if shape complexity is developed interactively through iterative Boolean shape operations between an existing shape and successive instances of a brush shape, curve definitions that suffer from two major shortcomings result. First, when the operation is complete, the resulting object has so many control points that the object becomes difficult to work with. Second, the resulting object appears computer generated and harsh; that is, the object lacks the smoothness and attention to curve continuity that designers typically give to their hand drawn shapes.

Finally, the techniques for performing pixel remappings do not generalize well to operating on curves comprised of control points, and are not appropriate for adding or removing curve detail.

SUMMARY

In general, in one aspect, this invention provides methods and apparatus, including computer program products, implementing and using techniques for performing computer graphics operations on an image represented by digital data. A representation of a digital image is received. The image includes vector objects and each of the objects is specified by control points. An editing brush is provided for interactive editing of the image by a user. The editing brush has a region of influence and applies a displacement function to control points in the region of influence, whereby when the editing brush is applied by the user to the image, a local distortion of the image is generated.

The invention can be implemented to realize one or more of the following advantages.

User control and artistic expressiveness can be enhanced through the following features. A variable sized brush under user control with a localized area of influence allows users to direct the application of distortion, detail enhancement, and curve simplification operations to portions of a curve. Convincing "painterly" curve edits can be achieved through simultaneous performance of control point remapping and complexity refinement. A limited introduction of control points maintains the usefulness of other tools in the drawing system. Tangent and curvature continuity can be preserved, which is necessary for preserving the visual cues that designers put in curve definitions as the curves undergo distortion operations. Smooth transitions at boundaries of an area of influence can be used to avoid artifacts that make it apparent that a curve was created with an automated process as opposed to being under the direction of a designer. Interactive performance can allow a user to focus on creative expression as opposed to the operation of the system's tools. A painterly interface resembling physical processes allows a user to focus on creative expression. Extensibility of the curve editing system allows for morph brushes not yet envisioned to be incorporated into the system.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A curve editing system implemented in accordance with the invention includes a set of eight drawing tools, which are also referred to as morph brushes. The curve editing system can be implemented as an addition to an existing drawing system, such as Adobe® Illustrator®, which features an extensible and open plug-in architecture.

Figure 1A:
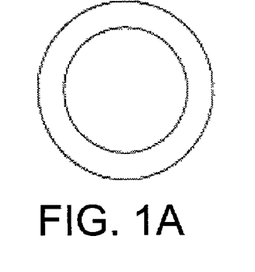
FIGS. 1A–1H are schematic illustrations of a source object and different result objects after drawing tools have been applied to the source object in accordance with the invention.
Figure 1B:
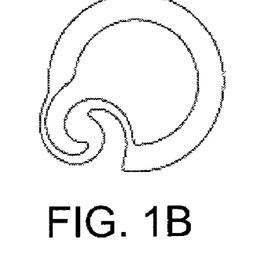
Figure 1C:
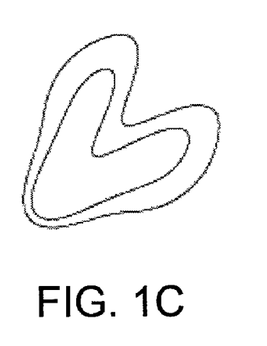
Figure 1D:
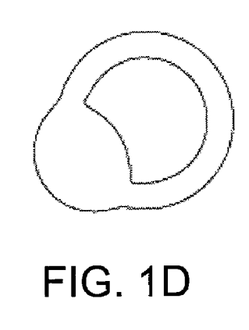
Figure 1E:
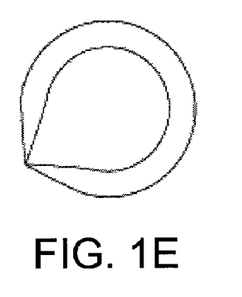
Figure 1F:
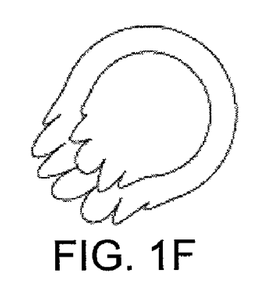
Figure 1G:
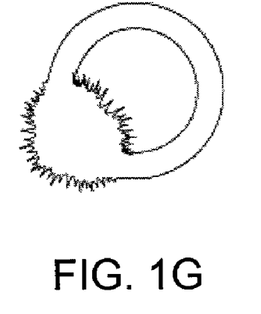
Figure 1H:
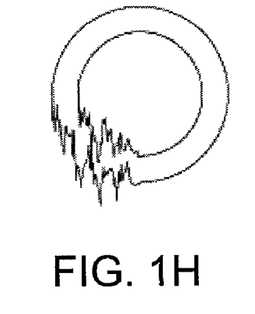

FIG. 1A shows a source object, namely a circle. FIGS. 1B–1H show how the source object is changed when seven of the eight different morph brushes remap and add detail to the circle shown in FIG. 1A. The eighth morph brush, simplify (not shown), can be used by a user to remove control points interactively. Each morph brush has a region of influence that can be selected by a user and that can have variable size and shape. The names of these seven morph brushes are swirl (the effect on the source object is shown in FIG. 1B), warp (the effect on the source object is shown in FIG. 1C), exhale (the effect on the source object is shown in FIG. 1D), inhale (the effect on the source object is shown in FIG. 1E), scallop (the effect on the source object is shown in FIG. 1F), crystallize (the effect on the source object is shown in FIG. 1G), and wrinkle (the effect on the source object is shown in FIG. 1H). The swirl, warp, exhale and inhale brushes are primarily intended for remapping control points on a curve, although these morph brushes generally introduce additional control points as well in order to achieve their visual effect. The scallop, crystallize and wrinkle brushes are primarily intended for introducing details into outlines by introducing additional control points, although these morph brushes generally also remap control points.

In one plug-in implementation, which will now be described, the interface to the host application is a messaging protocol that requires processing in response to the user's interaction with an input device, such as a computer mouse. The messages are primarily generated when a mouse button is initially depressed (mouse down), when the mouse is moved while a mouse button is depressed (mouse drag) and when a mouse button is released (mouse up). The only requirement for the mouse drag operation is that a mouse button be depressed, that is, the mouse can either be moved with a mouse button depressed or held stationary with a mouse button depressed to achieve a drag operation.

Curve definitions in a drawing system are typically represented as cubic polynomial Bezier splines. The control points along the curve are arranged in triplets. Each triplet of control points includes an anchor point (p) located on the curve and two tangent handles that connect a preceding tangent (in) with the anchor point, and a next tangent (out) with the anchor point, respectively. With this representation, a four point Bezier spline can be defined by two neighboring anchor points, the out tangent of the first anchor point, and the in tangent of second anchor point.

Figure 2:
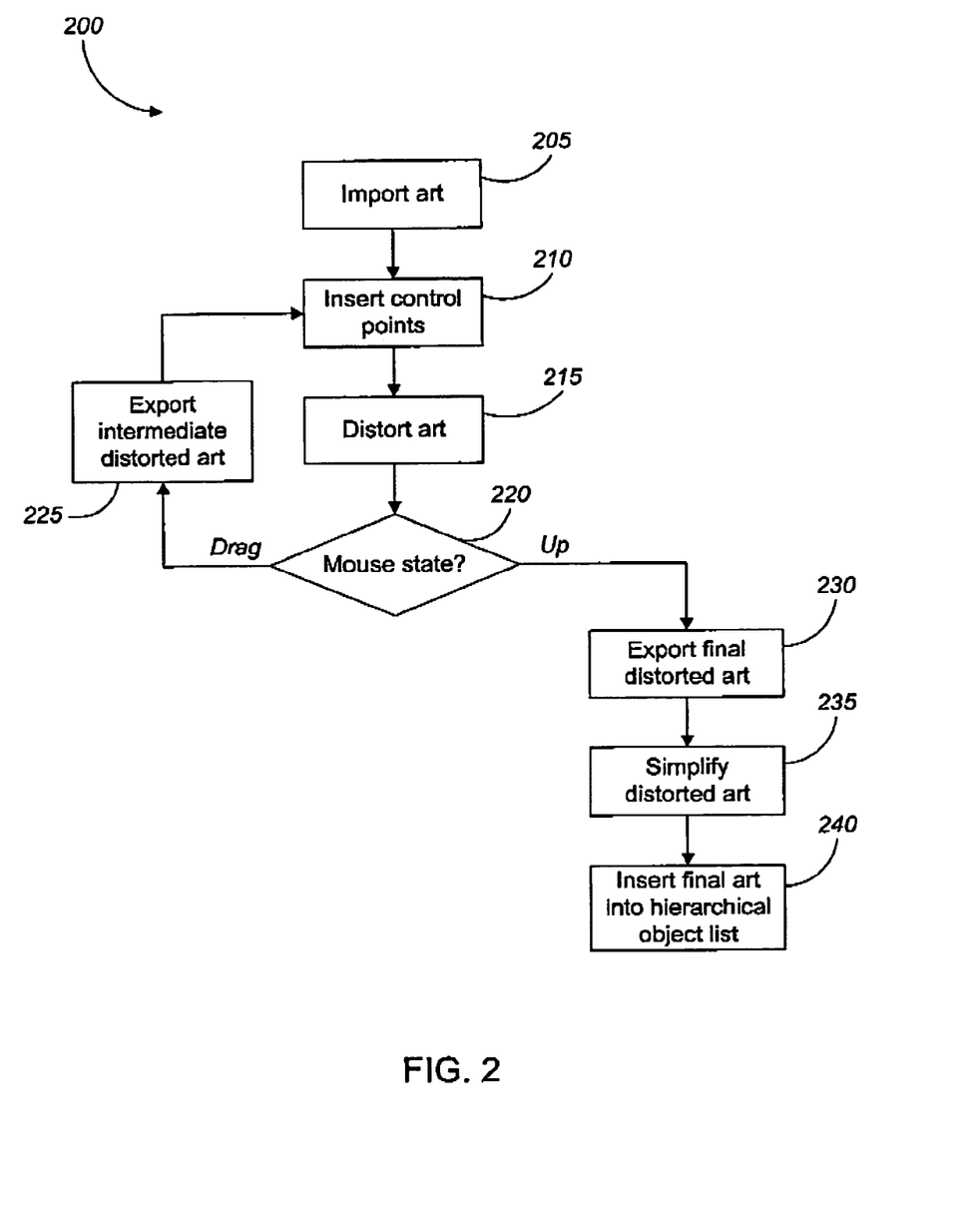
FIG. 2 is a schematic block diagram showing a schematic flow of control for one implementation of a morph brush in accordance with the invention.

As shown in FIG. 2, a procedure (200) for processing of a morph brush has a number of steps. The main steps are: import, insert, distort, export, and simplify. The procedure and the implementation of each step are identical for each morph brush, with the exception of the distort step, as will be described below. New types of morph brushes can be implemented by implementing new distortion operations that conform to the input/output requirements of the procedure and host application.

The procedure starts with importing art, including one or more objects, that is to be distorted (205). When the art is imported, the procedure translates the host's native data structures into internal data structures required by the curve editing system. These internal data structures are optimized for interactive performance. An example of internal data structures can be seen in Table 1 below. The data structures in Table 1 are essentially hierarchical, proceeding from the most rudimentary classes to those of higher level.

TABLE 1

| Data structure | Variables | Definition |
|---|---|---|
| class YKPathSegment { public:     AIPathSegment mSeg;     float mT;     long mMod;     long mSelect;     long mMesh; . . . }; | mSeg is the AIPathSegment (p, in, out etc.) mT keeps track of subdivision location mMod is set of the point is modified by the distort step. mSelect is a flag for the selection status of a control point. mMesh is used only when operating on gradient mesh art. | YKPathSegment is a wrapper around an AIPathSegment structure with supporting attributes |
| class YKPathSegments { private:     YKPathSegment mSeg;     int mLength;     int mSize;     int mBlock; . . . }; | mList is the array of path segments. mLength is the number of elements of the array in use. mSize is the size of the allocated array. mBlock is the number of elements to add to size when resizing an exhausted array. | YKPathSegments contains an array of YKPath-Segment, which can be used to define a complete path. |
| class YKPathMorph { public:     YKPathSegments mBefore, mAfter;     AIRealRect mBB;     int mSubDivisionsCount; . . . | mBefore contains the original segments. mAfter contains the original segments processed in the insert and distort | YKPathMorph defines a chunk (as will be described below) and contains two instances of YKPathSegments |

TABLE 1-continued

| Data structure | Variables | Definition |
| --- | --- | --- |
| }; | steps (will be described below). mBB is the bounding box of the chunk. mSub-DivisionsCount is utilized in the complexity level defined in the wrinkle, scallop and crystallize brushes. | (mBefore and mAfter). These two segments are used to create a third segment that has all the distortion, but without extra control handles. |
| class YKPathMorphList{ private:     YKPathMorph *mList;     int mLength;     int mSize;     int mBlock;     ... }; | See above | YKPathMorphList contains an array of YKPathMorph, which defines a complete path. |
| class YKListOfMorphLists{ private:     YKPathMorphList *mList;     int mLength;     int mSize;     int mBlock;     ... }; | See above | YKListOfMorphList contains an array of YKPathMorphList, which defines a series of paths. |
| class YKMeshMorph{ private:     AIArtHandle mArt;     AIMeshSelection mSelect;     YKListOfMorphList mVer, mHoz;     long mII, mJJ;     ... }; | mArt is the gradient mesh art mSelect has the selection status of the vertices of the mesh mVer, mHoz are the vertical and horizontal isoparms of the mesh translated into paths mII, mJJ are the number of u and v isoparms | YKMeshfMorph converts the isoparms (that is, lines of the same u and v) of a mesh into a collection of paths. After distortion (which will be described below), these paths are converted back into a mesh. |

The procedure then continues to the control point insertion step (210), where the procedure discerns which areas of the curve lie under a region of influence of the morph brush and introduces control point triplets on one or more curves that are defined on the source object, so that the inter-control point distances are minimized to a relative fraction of the selected brush size. In one implementation of the invention, a user can select the brush size by choosing a brush width (the horizontal size of the brush) and a brush height (the vertical size of the brush). The user also has the option to select the value of a detail parameter that determines the spacing between the new control point triplets, as measured by the distance between the anchor points. The larger value of the detail parameter, the more closely spaced the new anchor points will be. When a user has selected values for the brush size and the detail parameter, the maximum distance (MaxLen) between new control point triplets is calculated as:

MaxLen=BrushRadius/Detail where the value of the BrushRadius variable is the average of the brush width and brush height values. In order to calculate how many new control points to insert (NumSubDiv), the procedure calculates the distance (SegLen) between two existing control point triplets and divides this by the maximum distance (MaxLen) between new control point triplets, determined above, as:

NumSubDiv=SegLen/MaxLen

The purpose of the insertion step is to retain a sufficient number of control points in the curve definitions, so that morphed curves do not develop flat regions. This technique works well for small-scale artwork. However, if numerous or complex objects are introduced, problems may occur. Therefore, in order to ensure an efficient level of interaction for large objects as well, the insertion step also parses large objects internally into several pieces or chunks. A chunk is a series of consecutive control point triplets whose length is no greater than a fraction of the brush size. Each chunk has an associated bounding box. The chunk's bounding box is compared to the brush's bounding box prior to subdivisions and distortions so that these operations are performed only where necessary. Before insertion of a control point triplet, a copy of the curve is saved for use in the later steps in the procedure.

After new control points have been inserted, the procedure distorts the art (215). The distortion is accomplished by applying a displacement function to each control point that falls within the brush's region of influence. Each morph brush has a unique displacement function defined over the morph brush's region of influence. The displacement function governs how the control points within the brush's region of influence, that is, the tangent handles and the anchor point for each control point triplet, are shifted when the brush is applied to a path. As was seen in Table 1 above, the control point data structures include a flag that is set when a control point is actually distorted. Control points in areas of the curve that are not under the brush's region of influence will not have this flag set.

After the art has been distorted, the procedure checks the state of the mouse (220). If the mouse button is depressed the procedure continues by exporting the intermediate distorted art (225), independently of whether the mouse is moved or stationary. The export step performs the necessary data translation from the curve editing system's internal data structures to the host's native format. This allows a user to view intermediate results of a dragging operation in the host application interactively. In addition to the interactive display of intermediate results during a drag operation, an export step also occurs when a mouse button is released and the final edit is recorded in the host drawing system's hierarchical object list, as will be described below. Prior to translating any artwork into the host drawing system's native format, the export operation attempts to reduce the number of control points in the curve by examining the control point flags set in the distortion step. For areas of the curve that have not been distorted, the export step retrieves the corresponding sections from the un-inserted copy saved in the insertion step and substitutes these sections into the distorted curve. The reduced curve is then translated into the host's native format.

After exporting the art during a dragging operation, the procedure loops back to the insertion step (210), where the procedure again ensures that the curve definition retains its clarity and that no flattening will occur. As was described above, at every iteration, the insertion step retains a copy of the curve, without the introduced control points, for use in the later steps to simplify the distorted curves.

If the state of the mouse in step 220 is that the mouse button has been released (mouse up), this means that the final distorted version of the curve should be added to the hierarchical object list. The procedure exports the final distorted art to the host application (230), just as it did the intermediate distorted art during the drag operation. The procedure then continues by simplifying the art (235). The simplifying step (235) performs the inverse operations of the insertion step (210) and removes excessive control points in the curve. This step can optionally be omitted in the case of interactive display, as it is a relatively expensive calculation. Curve simplification is performed in a piece-wise fashion to areas of the curve that have been distorted. These simplified sections are then substituted back into the complete curve definition. When the curve has been simplified, the final version of the art is inserted into the hierarchical object list (240). This completes the discussion of the morph brush processing procedure.

Figure 3:
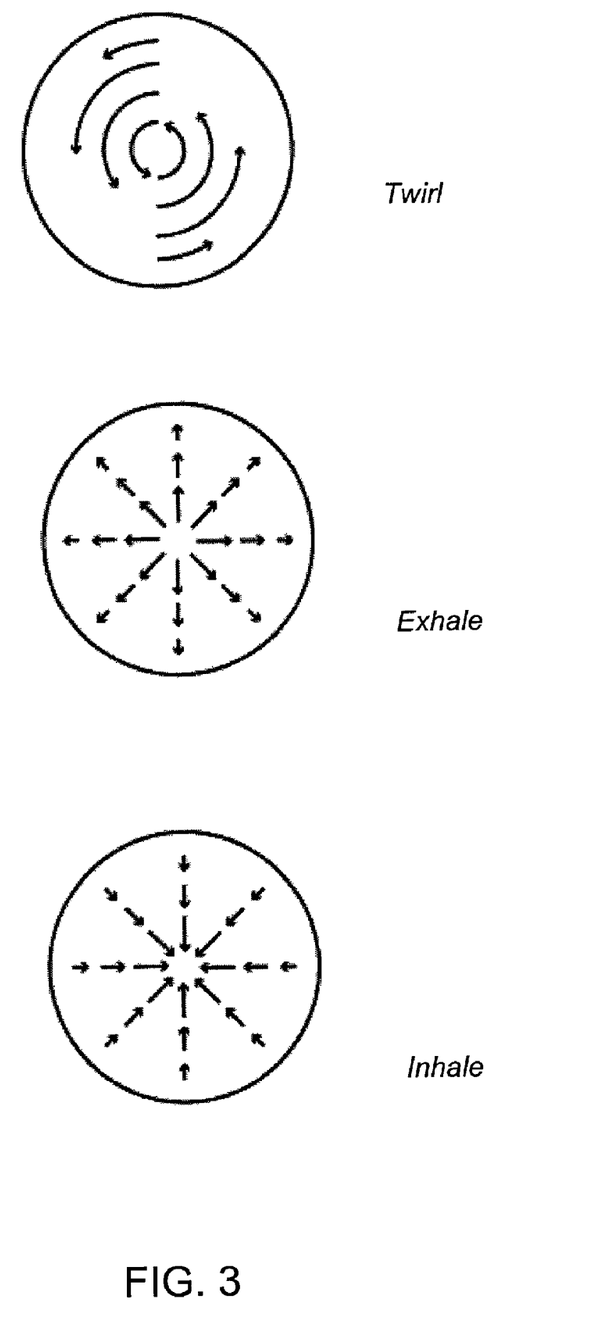
FIG. 3 is a schematic illustration of different distortion fields in accordance with the invention.
Figure 4:
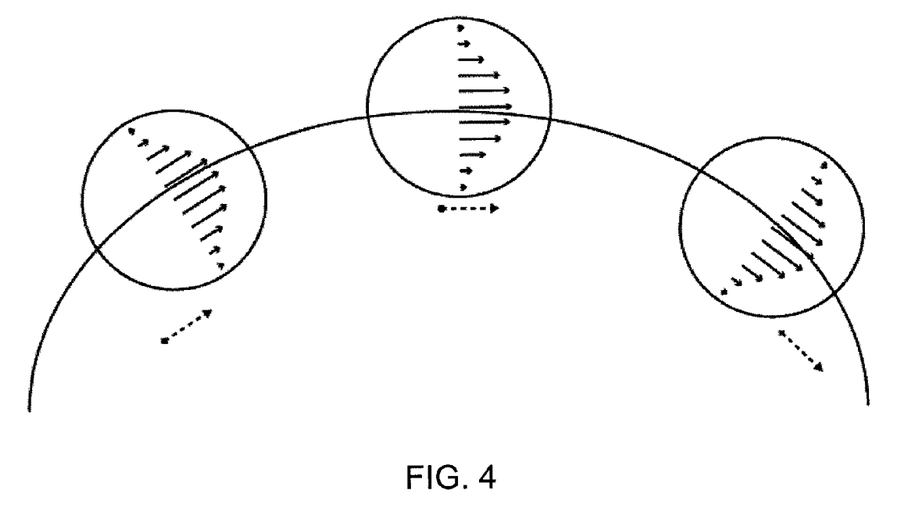
FIG. 4 is a schematic illustration of different warp distortion fields in accordance with the invention.

As discussed in connection with the distortion step (215) above, the procedure defines a displacement function over the morph brush's region of influence. One consideration when the displacement functions are designed is the desirability of a smooth falloff to zero influence at the limit of the brush region of influence, since this reduces discontinuities between sections of the curve that have been distorted and those that have not. FIG. 3 and FIG. 4 show exemplary schematic illustrations of different distortion fields generated by displacement functions.

Before a distortion field is applied, a continuity value is calculated for the curve segment to which the displacement function is to be applied. The distortion field then ensures continuity of equal or greater value as compared to the curve segment to which it is applied. For example, if a segment of a curve has a continuity value that is equal to c1, the distortion function makes sure the resulting curve after the distortion has a continuity value that is at least equal to c1. If the region of influence does not cover at least two of the three control points in a control point triplet, that is, the anchor point, the first tangent handle (in) and the second tangent handle (out), the continuity constraint is ignored and a curve segment a smaller continuity value may result after the displacement function has been applied. Table 2 below presents the different situations that may occur, and how the procedure applies the displacement functions to the anchor point (p), the first tangent handle (in) and the second tangent handle (out) for the control points. If a tangent handle or anchor point are under the brush, the point has the value 1 in Table 2. If the point is outside the brush's region of influence, it has the value 0. In Table 2, reference is made to a continuity assurance rule. The continuity assurance rule states that if the curvature has a c1 or higher continuity, the relative location of the anchor point (p) in relation to the (in) and (out) tangent handles should be the same before and after the displacements function is applied in order to ensure continuity. However, if the curve has continuity of position only (that is, the (in), (p) and (out) handles do not lie on a single line), the anchor point (p) will move according to the displacement function, independent of the (in) and (out) tangents to ensure sharp corners.

TABLE 2

| Value of (p, in, out) | Result |
| --- | --- |
| (0, 0, 0) and (0, 1, 1) | The control point is ignored. Nothing is moved by the displacement function. |
| (0, 0, 1) | Only the (out) tangent handle moves. Existing continuity is ignored. |
| (0, 1, 0) | Only the (in) tangent handle moves. Existing continuity is ignored. |
| (1, 0, 0) | Only the anchor point (p) moves. Existing continuity is ignored. |

TABLE 2-continued

| Value of (p, in, out) | Result |
| --- | --- |
| (1, 0, 1) | The (out) tangent handle moves, then the anchor point (p) moves in accordance with the continuity assurance rule described above. The continuity assurance rule will use the line from the original (in) tangent handle to the modified (out) tangent handle. |
| (1, 1, 0) | The (in) tangent handle moves, then the anchor point (p) moves in accordance with the continuity assurance rule described above. The continuity assurance rule will use the line from the modified (in) tangent handle to the original (out) tangent handle. |
| (1, 1, 1) | The (in) and (out) tangent handles move and the anchor point (p) is then moved in accordance with the continuity assurance rule. |

There are two types of distortion fields: those that are defined solely by the position of the brush (standard type), and fields that incorporate both brush position and trajectory (trajectory type). Six of the seven morph brushes are of the standard type; the warp brush is the only example of a trajectory brush. FIG. 3 shows a schematic illustration of the distortion fields for the twirl, exhale, and inhale brushes.

Trajectory brushes incorporate the trajectory of the brush in the displacement function describing the distortion field. FIG. 4 shows a succession of distortion fields for a warp brush where the mouse button is being held down and the mouse is dragged in an arc from left to right. The trajectory distortion fields will tend to translate control points in the direction the mouse is traveling. At each intermediate mouse position the field is different based on the current and previous mouse positions. In contrast, standard brushes have the identical field for all points along the drag.

The eighth morph brush, simplify, accomplishes its task by smoothing details of curves and remove superfluous control points. The smoothing is accomplished by creating a distortion field that moves control points towards the overall sweep of the curve. The current segment adjusts according to its previous and next segments. Two steps are processed in the following order. First, the current segment moves towards the average point defined by the previous and next anchor points (p). Afterwards, the first (in) and second (out) tangent handles for the current segment move towards the previous and next anchor points (p), respectively. The criteria established by the user for curve simplification will determine the rate at which control points are removed. Conceptually this is similar to removing the high frequencies in multi-resolution analysis. In contrast to multi-resolution analysis, the simplification morph brush reduces detail only in local areas specified by the user with a pointing device.

A particular implementation of the procedure for processing of a morph brush will now be described. The plug-in application in this implementation uses Adobe Illustrator as a host application.

The file in which the mouse down, drag, and up functions (also referred to as portals) reside also contains global variables for the mouse coordinates and an instance of the YKListOfMorphLists class, which is the collection of paths that will be operated on until the mouse is released, as described in Table 1 above. The user initiates the morph with a mouse down command. This calls a toolMouseDownPortal, in which a routine collects an array of selected objects to operate on. In the absence of any selections, the hierarchical artwork tree is traversed and an array of objects is constructed from objects that reside under the brush's region of influence at the initial mouse down. An array of selected art is examined to find path artwork, and the Adobe Illustrator path definitions are converted to the native data structures shown in Table 1. This completes the import step.

The user continues the morph by dragging the mouse, which calls a toolMouseDragPortal. The toolMouseDragPortal records the mouse position in a set of global variables and computes a drag vector to indicate the trajectory of the drag. The current morph brush is determined and passed to a routine that performs the insertion and distort steps.

An insertion step and a distortion step is performed for each drag. A SubDivideAt routine is called to carry out the control point insertion. The SubDivideAt routine obtains the bounding box of the brush and then looks for chunks whose bounds overlap that of the brush. If a chunk is found under the brush, the chunk is subdivided to keep the inter-control point distances less than some fraction of the brush size, as was described above. The chunk's subdivision count is incremented and its bounding box recalculated.

The procedure then invokes a MorphWithFunction routine containing a displacement function for the selected morph brush. For example, a Morph-Twirl routine determines the strength of the twirl for the p, in, and out points, based on where those points lie in relation to the brush, creates a transformation matrix and transforms the points accordingly. One implementation of the Morph-Twirl routine can be seen in Table 3 below. The functions in Table 3 that have names starting with the letters AI are functions that can be found in "Adobe Illustrator 9.0 Plug-in Software Development Kit Function Reference" (Adobe Systems Incorporated, 2000).

TABLE 3

```
//////////////////////////////////////////////
// Morph Twirl
//////////////////////////////////////////////
    void Morph_Twirl(AIRealMatrix *M, AIRealMatrix *Minv, YKPathSegment
&xSeg)
    {
    AIRealPoint p, in, out, p2;
        float t, denominator;
        float inf_in, inf_out, inf_p;
        float rad_in, rad_out, rad_p;
        long flag =0;
        float pressure = g->pressure;
    float angle =g->twirl_angle;
        AIRealMatrix MorphM;
        if(! xSeg. mSelect)
            return;
    MATRIX-BEGIN
    //calculating influences
    rad_in = abs_val(&in);
    inf_in = influnce_linear(rad_in);
    rad_out = abs_val(&out);
    inf_out = influnce_linear(rad_out);   //[0, 1 ]
    rad_p = abs_val(&p);
    inf_p = influnce_linear(rad_p);       //[0,1]
    /*...*/
    //calculation affine value for p, in, out
    denominator =get_length(out, in);
    if (denominator == 0)
        t=0;
    else
        t =get_length(p, in)/denominator;
    p2 =affine(in, out, t);
    /*...*/
        sAIRealMath->AIRealMatrixSetRotate(&MorphM, inf_in );
        sAIRealMath->AIRealMatrixXformPoint(&MorphM, &in, &in);
        sAIRealMath->AIRealMatrixSetRotate(&MorphM, inf_out);
        sAIRealMath->AIRealMatrixXformPoint(&MorphM, &out, &out);
        if (abs_val(p-p2)<kFudgeEqual){
            p =affine(in, out, t);
            }
        else {
            sAIRealMath->AIRealMatrixSetRotate(&MorphM, inf_p);
            sAIRealMath->AIRealMatrixXformPoint(&MorphM, &p, &p);
            }
        xSeg. mMod =kVMSegmentAllModified,
    /*...*/
        MATRIX-END
    }
```

Finally, the distorted object is output as Adobe Illustrator artwork with a call to a MouseUpExport routine when the user releases the mouse button. All the chunks are examined and segments of the curve that have not been distorted are replaced with their previously stored copies. The MouseUpExport also performs data reduction of the morphed sections of the curve through a simplification process. Simplification is performed for brushes that are primarily intended for remapping control points (warp, twirl, inhale, exhale). No simplification is performed for the brushes primarily intended for introducing details (scallop, crystallize, and wrinkle). The simplification is controlled by a flatness parameter that defines the maximum deviation of the simplified curve, from the original curve.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims.

What is claimed is:

1. A computer program product for performing computer graphics operations on an image represented by digital data, the product tangibly embodied in a computer-readable medium or propagated signal, the product comprising instructions operable to cause a programmable processor to:

receive a representation of a digital image, the image comprising vector objects, each of the vector objects comprising one or more curves, each curve having a shape specified by respective control points; and provide an editing brush for interactive editing of the image by a user, the editing brush having a size and shape defining a region of influence, the editing brush defining a displacement function over the region of influence, the displacement function having a displacement value at each position within the region of influence, each application of the editing brush operating to apply directly to each control point that is within the region of influence at that application of the editing brush, and not to other control points, a displacement determined according to the displacement value of the displacement function at the position of the control point in the region of influence.

2. The product of claim 1, further comprising instructions to:

receive a user input specifying the shape for the region of influence.

3. The product of claim 1, further comprising instructions to:

receive a user input specifying the size for the region of influence.

4. The product of claim 1, further comprising instructions to:

add control point triplets to curves within the region of influence to refine a complexity of the image preparatory to application of the editing brush.

5. The product of claim 4, further comprising instructions to:

determine at each application of the editing brush whether to add control point triplets according to a user-specified value of a detail parameter.

6. The product of claim 4 or 5, further comprising instructions to:

remove from the image those control point triplets added to refine the complexity of the image that were not displaced by application of the editing brush.

7. The product of claim 4, further comprising instructions to:

save curve segment data of the image before application of the editing brush and replace segments of image curves that have not been distorted by the editing brush with their previously saved copies.

8. The product of claim 4, further comprising instructions to:

apply a path simplification process in a piece-wise fashion to areas of curves that have been distorted.

9. The product of claim 1, wherein the displacement function provides a smooth falloff to zero influence at the limit of the region of influence.

10. The product of claim 1 or 2, further comprising instructions to:

determine a continuity constraint for each anchor point in the region of influence before the displacement function is applied; and ensure that each anchor point in the region of influence satisfies the continuity constraint after the editing brush is applied.

11. The product of claim 1 or 2, wherein each control point is either an anchor point or a tangent handle, the product further comprising instructions to:

determine a continuity constraint in the region of influence for each anchor point that has at least one adjacent tangent handle also in the region of influence, the continuity constraint being determined before the displacement function is applied; and ensure that the continuity constraint for each such anchor point is satisfied after the editing brush is applied.

12. The product of claim 1, wherein a parameter of the displacement function is a trajectory of the editing brush as applied by the user.

13. The product of claim 1, wherein the displacement function defines a vector field of displacements over the region of influence.

14. The product of claim 13, wherein a trajectory of the editing brush as applied by the user determines a rotational orientation of the vector field around an axis perpendicular to an image plane.

15. The product of claim 1, further comprising instructions to implement a simplify editing brush, comprising instructions to:

smooth details of curves; and
remove superfluous control points.

16. The product of claim 15, wherein the instructions to smooth comprise instructions to:
move control points of a curve in the region of influence towards the overall sweep of the curve.

17. The product of claim 15, wherein the instructions to remove control points comprise instructions to:
remove control points at a rate determined by the user.

18. The product of claim 1, wherein the displacement function defines a swirl effect.

19. The product of claim 1, wherein the displacement function defines a warp effect.

20. The product of claim 1, wherein the displacement function defines an exhale effect.

21. The product of claim 1, wherein the displacement function defines an inhale effect.

22. The product of clam 1, wherein the displacement function defines a scallop effect.

23. The product of claim 1, wherein the displacement function defines a crystallize effect.

24. The product of claim 1, wherein the displacement function defines a wrinkle effect.

25. A method for performing computer graphics operations on an image represented by digital data, comprising:
receiving a representation of a digital image, the image comprising vector objects, each of the vector objects comprising one or more curves, each curve having a shape specified by respective control points; and
providing an editing brush for interactive editing of the image by a user, the editing brush having a size and shape defining a region of influence, the editing brush defining a displacement function over the region of influence, the displacement function having a displacement value at each position within the region of influence, each application of the editing brush operating to apply directly to each control point that is within the region of influence at that application of the editing brush, and not to other control points, a displacement determined according to the displacement value of the displacement function at the position of the control point in the region of influence.

26. The method of claim 25, further comprising:
receiving a user input specifying the shape for the region of influence.

27. The method of claim 25, further comprising:
receiving a user input specifying the size for the region of influence.

28. The method of claim 25, further comprising:
adding control point triplets to curves within the region of influence to refine a complexity of the image preparatory to application of the editing brush.

29. The method of claim 28, further comprising:
determining at each application of the editing brush whether to add control point triplets according to a user-specified value of a detail parameter.

30. The method of claim 28 or 29, further comprising:
removing from the image those control point triplets added to refine the complexity of the image that were not displaced by application of the editing brush.

31. The method of claim 28, further comprising:
saving curve segment data of the image before application of the editing brush and replace segments of image curves that have not been distorted by the editing brush with their previously saved copies.

32. The method of claim 28, further comprising:
applying a path simplification process in a piece-wise fashion to areas of curves that have been distorted.

33. The method of claim 25, wherein the displacement function provides a smooth falloff to zero influence at the limit of the region of influence.

34. The method of claim 25 or 26, further comprising:
determining a continuity constraint for each anchor point in the region of influence before the displacement function is applied; and
ensuring that each anchor point in the region of influence satisfies the continuity constraint after the editing brush is applied.

35. The method of claim 25 or 26, wherein each control point is either an anchor point or a tangent handle, further comprising:
determining a continuity constraint in the region of influence for each anchor point that has at least one adjacent tangent handle also in the region of influence, the continuity constraint being determined before the displacement function is applied; and
ensuring that the continuity constraint for each such anchor point is satisfied after the editing brush is applied.

36. The method of claim 25, wherein a parameter of the displacement function is a trajectory of the editing brush as applied by the user.

37. The method of claim 25, wherein the displacement function defines a vector field of displacements over the region of influence.

38. The method of claim 37, wherein a trajectory of the editing brush as applied by the user determines a rotational orientation of the vector field around an axis perpendicular to an image plane.

39. The method of claim 25, further comprising implementing a simplify editing brush, including:
smoothing details of curves; and
removing superfluous control points.

40. The method of claim 39, wherein smoothing comprises:
moving control points of a curve in the region of influence towards the overall sweep of the curve.

41. The method of claim 39, wherein removing control points comprises:
removing control points at a rate determined by the user.

42. The method of claim 25, wherein the displacement function defines a swirl effect.

43. The method of claim 25, wherein the displacement function defines a warp effect.

44. The method of claim 25, wherein the displacement function defines an exhale effect.

45. The method of claim 25, wherein the displacement function defines an inhale effect.

46. The method of claim 25, wherein the displacement function defines a scallop effect.

47. The method of claim 25, wherein the displacement function defines a crystallize effect.

48. The method of claim 25, wherein the displacement function defines a wrinkle effect.

* * * * *